United States Patent [19]

Linder

[11] 4,307,802
[45] Dec. 29, 1981

[54] CONNECTION MEANS FOR A SCRAPER-CHAIN CONVEYOR

[75] Inventor: Walter Linder, Lunen, Fed. Rep. of Germany

[73] Assignee: Gewerkschaft Eisenhutte Westfalia, Lunen, Fed. Rep. of Germany

[21] Appl. No.: 143,388

[22] Filed: Apr. 24, 1980

[30] Foreign Application Priority Data

Apr. 26, 1979 [DE] Fed. Rep. of Germany ....... 2916924

[51] Int. Cl.$^3$ ............................................. B65G 19/28
[52] U.S. Cl. ..................................... 198/735; 198/861
[58] Field of Search ....................... 198/735, 860, 861; 299/43, 64

[56] References Cited

U.S. PATENT DOCUMENTS

| 4,133,424 | 1/1979 | Sabes | 198/735 |
| 4,157,751 | 6/1979 | Grundken et al. | 198/735 |

FOREIGN PATENT DOCUMENTS

| 1301994 | 9/1969 | Fed. Rep. of Germany | 198/735 |
| 1527390 | 10/1978 | United Kingdom | 198/735 |
| 213670 | 5/1968 | U.S.S.R. | 198/735 |

*Primary Examiner*—Joseph E. Valenza
*Attorney, Agent, or Firm*—Sughrue, Mion, Zinn, Macpeak and Seas

[57] ABSTRACT

A scraper-chain conveyor comprises a plurality of channel sections joined together end-to-end. Each channel section has a pair of side walls joined together by a floorplate. The floorplates separate upper and lower runs for a scraper-chain assembly which circulates within the conveyor. Each of the side walls has a generally sigma-shaped cross-section defined by a V-shaped recess in that side wall. Each floorplate is connected to the side walls of its channel section at the bases of their V-shaped recesses. Each side wall of each channel section is connected to the adjacent side wall of each adjacent channel section by respective connection means constituted by a pair of coupling elements and a coupling member. One coupling element of each pair is attached to one side wall of a given channel section, and the other coupling element of that pair is attached to the adjacent side wall of the adjacent channel section. The coupling elements project laterally beyond their respective side walls, and the coupling member connects the two coupling elements together. The two coupling elements are provided with recessed portions which receive the coupling member. The upper inclined portions of the side walls that define the V-shaped recesses are formed with apertures through which the coupling member can be inserted into the recessed portions from the upper run of the conveyor.

15 Claims, 4 Drawing Figures

CONNECTION MEANS FOR A SCRAPER-CHAIN CONVEYOR

BACKGROUND OF THE INVENTION

This invention relates to a scraper-chain conveyor for use in a mineral mine working, and in particular to connection means for connecting the channel sections of such a conveyor.

Numerous devices for connecting the individual channel sections of scraper-chain conveyors are known. Such devices normally resist the tensile forces which tend to draw the ends of the channel sections apart, and allow some angular mobility between the channel section ends. The connection devices are often subjected to very high forces during operation, not only the tensile forces which they are designed to resist, but also buckling forces tending to displace the conveyor ends laterally and/or vertically. Primarily, the lateral forces occur when the conveyor is shifting up to follow the mineral winning progress. This is usually accomplished by means of rams, which shift individual lengths of the conveyor in a so-called "snaking" movement. The vertical forces usually occur when a mining machine supported on the conveyor is moved, for example, along the mineral face. Where the floor of the mine working is uneven, these lateral and vertical forces can increase substantially.

Normally, the individual channel sections of a scraper-chain conveyor are provided with interlocking coupling elements on the adjacent ends of each pair of adjacent channel sections. One coupling element of each adjacent pair is provided with a projection which mates, with an all-round clearance, with a recess in the other coupling element of that pair. This permits the required angular mobility between adjacent channel sections. Each pair of interlocked coupling elements is connected together by means of screw bolts, which are inserted from the exterior of the channel sections, so that the tensile forces can be transmitted between the channel section ends. This results in a fairly slow and complicated assembly and disassembly process.

It is also known to join the interlocking coupling elements together by means of a coupling member of the type having an enlarged head at each end of a threadless shank, in which case laterally open recesses are provided in the coupling elements for receiving the coupling member. Unfortunately, special retaining elements are necessary to complete the connection, and these can be dislodged during operation.

It is the aim of the invention to provide a connection means for interconnecting the channel sections of a scraper-chain conveyor, the connection means being capable of simple and rapid assembly and disassembly but being such that unintentional disassembly during mining operations is prevented.

SUMMARY OF THE INVENTION

The present invention provides a scraper-chain conveyor comprising a plurality of channel sections joined together end-to-end, each channel section having a pair of side walls joined together by a floorplate, the floorplates separating upper and lower runs for a scraper-chain assembly which, in use, circulates within the conveyor, each of the side walls having a generally sigma-shaped cross-section defined by a V-shaped recess in that side wall, each floorplate being connected to the side walls of its channel section at the bases of their V-shaped recesses, each side wall of each channel section being connected to the adjacent side wall of the or each adjacent channel section by respective connection means, wherein each connection means is constituted by a pair of coupling elements and a coupling member, one coupling element of each pair being attached to one side wall of a given channel section, and the other coupling element of that pair being attached to the adjacent side wall of the adjacent channel section, the coupling elements projecting laterally beyond their respective side walls, and the coupling member connecting the two coupling elements together, wherein the two coupling elements are provided with recessed portions which receive the coupling member, and the upper inclined portions of the side walls that define the V-shaped recesses are formed with apertures provided with connectors for the connection of built-on parts such as rubble plates, guide boards and the like.

Advantageously, one coupling element of each pair is provided with a projection which mates, with an all-round clearance, with a recess in the other coupling element of that pair.

Preferably, those portions of the coupling elements which project laterally beyond their respective side walls constitute alignment devices for spill plates, said projecting portions of each pair of coupling elements defining a generally rectangular alignment device.

Conveniently, those portions of the coupling elements which project laterally beyond their respective side walls have a height which equals the maximum height of the V-shaped recesses.

Advantageously, the parts of the recessed portions of the coupling elements that accommodate the head portions of the coupling members are open towards the outside surfaces of the coupling elements, said parts being inclined downwardly from the apertures in said upper inclined portions of the side walls.

Preferably, the coupling elements are made from a high-strength material such as hard manganese steel.

BRIEF DESCRIPTION OF THE DRAWINGS

The invention will now be described in greater detail, by way of example, with reference to the accompanying drawings, in which.

DESCRIPTION OF PREFERRED EMBODIMENT

Figure 1:
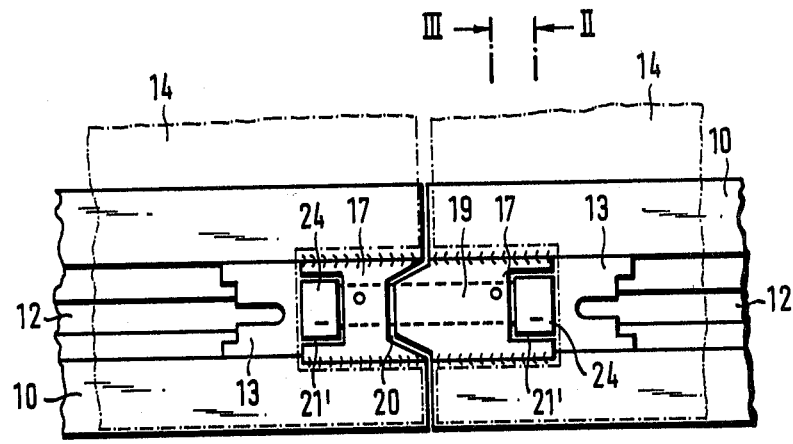
FIG. 1 is a side elevation of the adjacent end portions of two channel sections of a scraper-chain conveyor, the channel sections being connected together by connection means constructed in accordance with the invention.
Figure 4:
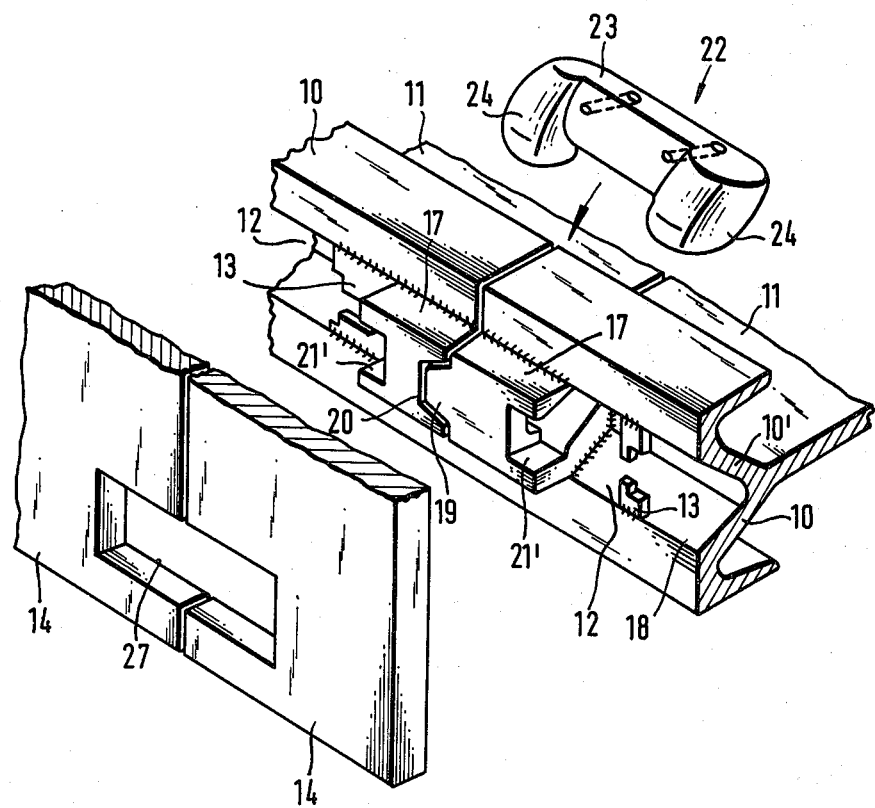
FIG. 4 is a perspective view of part of the arrangement shown in FIGS. 1 to 3.

Referring to the drawings, the scraper-chain conveyor is constituted, in a known manner, by a plurality of channel sections arranged end-to-end. FIGS. 1 and 4 show the adjacent end portions of two such channel sections, each of which is constituted by a pair of side walls 10, each of which has a generally sigma-shaped cross-section, and a floorplate 11 welded between the bases of V-shaped central recesses 12 of the side walls. Each of the side walls 10 is provided with spill-plate holders 13 which are welded into their V-shaped recesses 12. Spill plates 14 are secured to the holders 13 by means of bolts (not shown). The floorplates 11 of the channel sections separate the two runs 15 and 16 of a circulating scraper-chain assembly (not shown), the upper run 15 being the conveying run, and the lower run 16 the return run.

The individual channel sections are joined together in a tension-proof manner, and in such a way as to permit limited articulation between adjacent sections. The connection of each pair of adjacent channel sections is accomplished by connection means associated with both sets of side walls 10 of that pair of channel sections. As all these connection means identical, only one of them will be described in detail.

Figure 2:
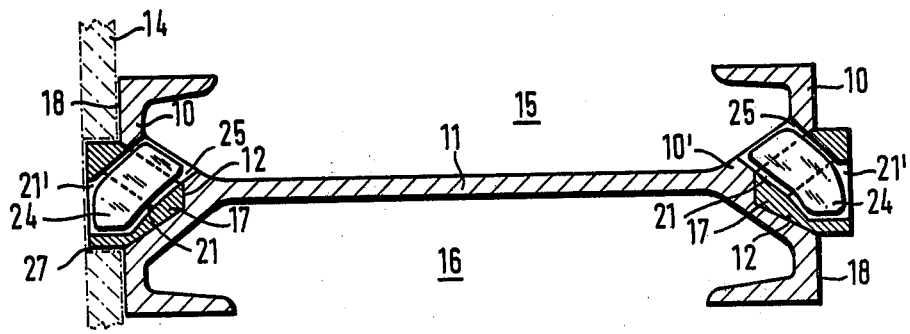
FIG. 2 is a cross-section taken on the line II—II of FIG. 1.
Figure 3:
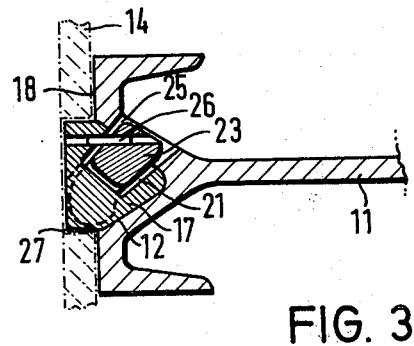
FIG. 3 is a cross-section taken on the line III—III of FIG. 1.

Thus, each connection means has a pair of coupling elements 17 which are welded into the V-shaped recesses 12 at the adjacent ends of the side walls 10 of the respective channel sections. As shown in FIGS. 2 to 4, each of the coupling elements projects beyond the lateral face 18 of the respective side wall 10. One coupling element 17 of each pair has a projection 19 which mates, with an all-round clearance, with a recess 20 in the other coupling element of that pair (see FIGS. 1 and 4). This ensures that the channel sections are joined together to permit the required limited articulation.

Each of the coupling elements 17 is formed with a laterally-open recess 21. A coupling member 22 (see FIG. 4), having a shank 23 joining a pair of head portions 24, is provided for connecting the two coupling elements 17. The head portions 24 have a larger cross-section than the shank 23, and the entire coupling member 22 mates with the recesses 21 in the coupling elements 17, the recesses 21 having widened portions 21' for receiving the head portions 24.

The side walls 10 of the channel sections are provided with apertures 25, these apertures being formed in the ends of those portions of the side walls which define the upper, inclined faces of the V-shaped recesses 12. The apertures 25 are shaped to receive the coupling members 22 and communicate both with the recesses 21 and the upper run 15 of the conveyor.

In order to connect two adjacent channel sections together, the channel sections are positioned in such a way that the projections 19 and the recesses 20 of the coupling elements 17 are in engagement. The coupling members 22 are then inserted through the apertures 25 and into the recesses 21 from the upper run of the conveyor. The head portions 24 of the coupling members 22 lie in the widened portions 21' of the recesses 21, and are supported both by the coupling elements 17 and by the edges of the apertures 25 in the side wall portions 10'. The coupling members 22 are held in place by simple clamping sleeves 26 (see FIG. 3), which are introduced, from the upper run 15 of the conveyor, into aligned holes (not shown) in the coupling members and the coupling elements 17.

The height of the projecting portions of the coupling elements 17 corresponds to the height of the V-shaped recesses 12 in the channel section side walls 10, and these projecting portions have a generally rectangular outline. These projecting parts of the coupling elements 17 thus form alignment devices for the spill plates 14, which themselves are provided with rectangular openings 27 which mate with the projecting parts (see FIG. 4). The bolts used to secure the spill plates 14 to their holders 18 can be inserted from within the holders so that their bolt heads are located behind the holders within the V-shaped recesses 12.

As best seen from FIGS. 2 and 4, the widened recessed portions 21' which accommodate the head portions 24 of the coupling members 22, are inclined downwardly, so that any dirt or coal dust which gets into the recesses 21 can escape at the lower ends of the widened portions 21'.

The coupling elements 17 are preferably made of a high-strength material such as hard manganese steel. Moreover, the shape of the coupling members 22 is not dependent upon the dimensions of the V-shaped recesses 12, since the coupling elements 17 project laterally beyond the lateral faces of the side walls 10. Consequently, particularly strong coupling members 22 can be used.

It will be apparent that the connection means described above could be modified in a number of ways. For example, the coupling elements 17 may be components of reinforcement strips, which are welded on to the exterior of the side walls 10 to strength the channel sections. It is also possible to weld support members into the V-shaped recesses 12, these members lying flush with the lateral faces 18 of the side walls 10. In this case, the support members form, together with coupling elements arranged on the side walls 10, recesses for receiving the coupling members 22.

I claim:

1. A scraper-chain conveyor comprising a plurality of channel sections joined together end-to-end, each channel section having a pair of side walls joined together by a floorplate, the floorplates separating upper and lower runs for a scraper-chain assembly which circulates within the conveyor, each of the side walls having a generally sigma-shaped cross-section defined by a V-shaped recess in that side wall, each floorplate being connected to the side walls of its channel section at the bases of their V-shaped recesses, each side wall of each channel section being connected to the adjacent side wall of each adjacent channel section by respective connection means, wherein each connection means is constituted by a pair of coupling elements and a coupling member, one coupling element of each pair being attached to one side wall of a given channel section, and the other coupling element of that pair being attached to the adjacent side wall of the adjacent channel section, the coupling elements projecting laterally beyond their respective side walls, and the coupling member connecting the two coupling elements together, wherein the two coupling elements are provided with recessed portions which receive the coupling member, and the upper inclined portions of the side walls that define the V-shaped recesses are formed with apertures through which the coupling member can be inserted into the recessed portions of the coupling elements from the upper run of the conveyor.

2. A conveyor according to claim 1, wherein each coupling element is welded to its respective channel section side wall adjacent to one end thereof.

3. A conveyor according to claim 1, wherein each coupling member is constituted by a shank provided with a head portion at each end thereof, the head portions having a larger cross-section than that of the shank.

4. A conveyor according to claim 3, wherein the recessed portions of the coupling elements have widened portions for accommodating the head portions of the coupling members.

5. A conveyor according to claim 3, wherein the head portions of each coupling member project, when seated in their recessed portions, laterally beyond the respective side walls.

6. A conveyor according to claim 1, wherein each coupling member is supported partly on the associated coupling elements, and partly on the respective side walls.

7. A conveyor according to claim 1, wherein one coupling element of each pair is provided with a projection which mates, with an all-round clearance, with a recess in the other coupling element of that pair.

8. A conveyor according to claim 1, wherein those portions of the coupling elements which project laterally beyond their respective side walls constitute alignment devices for spill plates.

9. A conveyor according to claim 8, wherein said projecting portions of each pair of coupling elements define a generally rectangular alignment device.

10. A conveyor according to claim 1, wherein those portions of the coupling elements which project laterally beyond their respective side walls have a height which equals the maximum height of the V-shaped recesses.

11. A conveyor according to claim 3, wherein the parts of the recessed portions of the coupling elements that accommodate the head portions of the coupling members are open towards the outside surfaces of the coupling elements.

12. A conveyor according to claim 11, wherein said parts of the recessed portions are inclined downwardly from the apertures in said upper inclined portions of the side walls.

13. A conveyor according to claim 1, wherein the coupling elements are made from a high-strength material such as hard manganese steel.

14. A conveyor according to claim 1, wherein the coupling elements constitute reinforcement means for strengthening the side walls of the channel sections.

15. In a scraper-chain conveyor comprising a plurality of channel sections joined together end-to-end, each channel section having a pair of side walls joined together by a floorplate, the floorplates separating upper and lower runs for a scraper-chain assembly which circulates within the conveyor, each of the side walls having a generally sigma-shaped cross-section defined by a V-shaped recess in that side wall, each floorplate being connected to the side walls of its channel section at the bases of their V-shaped recesses, each side wall of each channel section being connected to the adjacent side wall of each adjacent channel section by respective connection means, wherein each connection means is constituted by a pair of coupling elements and a coupling member, one coupling element of each pair being attached to one side wall of a given channel section, the other coupling element of that pair being attached to the adjacent side wall of the adjacent channel section, and the coupling member connecting the two coupling elements together, wherein the two coupling elements are provided with recessed portions which receive the coupling member, the improvements comprising providing coupling elements which project laterally beyond their respective side walls, and forming apertures in the upper inclined portions of the side walls that define the V-shaped recesses, the coupling members being inserted through said apertures and into the recessed portions of the coupling elements from the upper run of the conveyor thereby completing said connection means.

* * * * *